United States Patent [19]

Jernigan

[11] Patent Number: 5,148,088
[45] Date of Patent: Sep. 15, 1992

[54] LIMITING X-RAY PRODUCTION IN AN OPERATING CRT

[75] Inventor: Forest E. Jernigan, Morristown, Tenn.

[73] Assignee: North American Philips Corporation, New York, N.Y.

[21] Appl. No.: 769,612

[22] Filed: Oct. 1, 1991

[51] Int. Cl.$^5$ .............................. H01J 29/70
[52] U.S. Cl. .................... 315/411; 358/190; 358/243
[58] Field of Search ............ 315/411, 408; 358/190, 358/243

[56] References Cited

U.S. PATENT DOCUMENTS

| | | | |
|---|---|---|---|
| 4,321,513 | 3/1982 | Knight | 315/411 |
| 4,335,335 | 6/1982 | Willis | 315/411 |
| 4,654,717 | 3/1987 | Stoughton | 358/243 |
| 4,698,557 | 10/1987 | Harlos | 315/383 |
| 4,792,733 | 12/1988 | Redfern | 315/386 |

FOREIGN PATENT DOCUMENTS 2240243 7/1991 United Kingdom .

OTHER PUBLICATIONS

"Automatic CRT Heater control", IBM Technical Disclosure Bulletin vol. 29, No. 9, Feb., 1987, pp. 3896–3898.

Primary Examiner—Theodore M. Blum
Attorney, Agent, or Firm—Edward W. Goodman

[57] ABSTRACT

A method and circuit for preventing excessive CRT X-ray production by continually measuring operating parameters of the CRT that are correlated with X-ray production during this operation. The measured parameters are continually compared with predetermined limit values, and various CRT operation controls are adjusted in response to the comparison to maintain the measured parameter values below the predetermined limit values.

22 Claims, 2 Drawing Sheets

LIMITING X-RAY PRODUCTION IN AN OPERATING CRT

BACKGROUND OF THE INVENTION

1. Field of The Invention

The present invention relates to a method and a circuit for limiting X-ray production in operating cathode ray tubes, and more particularly for adjusting the CRT operation to limit X-ray production while allowing operation of the CRT to continue.

During operation of a cathode ray tube, electrons are accelerated through a high potential difference, on the order of tens of kilovolts. As a consequence, they acquire large kinetic energy and will cause X-ray production when they undergo collision with matter. In order to guard against X-ray overexposure of people in proximity to apparatus which has a CRT, the United States government has promulgated regulations concerning the permissible limits to X-ray production. As they apply to television receivers, these regulations are presently set forth at Title 21, Code of Federal Regulations, Section 1020.

2. Description of The Related Art

In order to meet the Federal regulations, it is an established practice to incorporate in television receivers a control circuit which turns the receiver off when operating conditions which may result in excessive X-ray production occur. It is not practicable to measure the X-ray flux directly; instead the operating parameters of the cathode ray tube are measured and when they reach values which might result in excessive X-ray production, the CRT is rendered inoperative. The type of protection circuits currently in use are analog latching circuits which disable the CRT anode supply in the receiver in the event that the anode power or voltage exceeds predetermined limits for the particular receiver CRT. Although this type of protection circuit does ensure compliance with the Federal regulations, the conventional protection circuit has drawbacks.

The conventional protection circuits often are rendered operative and shut down the CRT during input signal transitions or during momentary horizontal oscillator excursions caused by non-standard signal reception. Additionally, these analog circuits require very tight component tolerances to ensure their proper operation. Notwithstanding the use of precision components, it is still necessary to design the protection circuit to operate the CRT with a margin in its operating parameters to ensure that excessive X-ray production does not occur under worst case conditions. As a result, the CRT may have to be operated at operating parameter values for which there is a considerable compromise in performance.

It would be desirable to have the protection circuit adjust the operation of a CRT to maintain it operating under permissible conditions, and not shut it off under transient conditions that will not result in excessive x-ray production.

SUMMARY OF THE INVENTION

It is an object of the invention to provide a method of and an apparatus for operating a CRT which continually monitors the operating parameters of an operating CRT and adjusts various operation controls of the CRT in order to maintain the operating parameters within permissible ranges.

It is another object of the invention to provide a method and circuit for avoiding excessive x-ray production in a operating CRT which is digital and reduces the requirements for precision analog components.

According to the invention, the operating parameters of an operating CRT that are correlated with x-ray production are continually measured. The measured operating parameter values are continually compared with predetermined values of the operating parameters during operation of the CRT. As a result of the comparison, various operation controls for the CRT are adjusted to maintain the operating parameters below certain predetermined limit values corresponding to the limits of permissible x-ray production by the CRT.

The operating parameters measured include the anode voltage of the CRT, the CRT beam current and possibly others like the high voltage supply voltage. The comparison of the measured parameter values and the predetermined parameter values is carried out under microprocessor control. The microprocessor compares each of the measured operating parameter values in succession with a corresponding limit value and continually repeats the sequence of successive comparisons.

The various operation controls for the cathode ray tube are then adjusted by the microprocessor within a hierarchical sequence.

DESCRIPTION OF PREFERRED EMBODIMENTS

Figure 1:
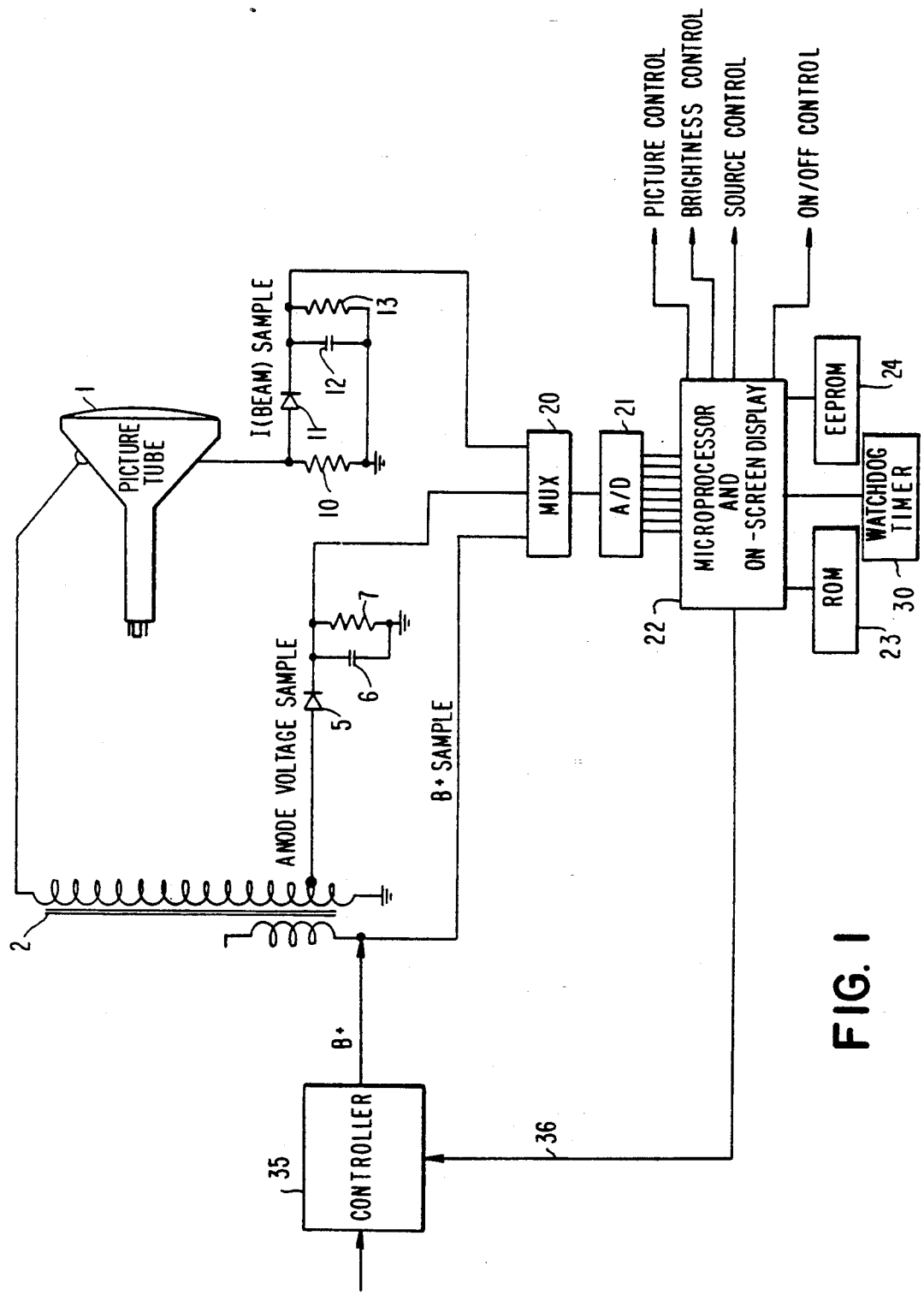
FIG. 1 is a schematic diagram of a protection circuit according to the invention.

FIG. 1 illustrates a circuit of part of an apparatus having a cathode ray tube (CRT) and the X-ray protection circuit according to the invention. The CRT 1 is operated by an anode voltage supplied from the secondary winding of a high voltage transformer 2. The primary winding of the transformer 2 receives the high voltage supply voltage B+ which is stepped up by the transformer 2 to the anode voltage. The anode voltage is sensed by a circuit including diode 5, capacitor 6 and resistor 7. This circuit operates as a simple half-wave rectifier, and the voltage developed across the resistor 7 has a value which is indicative of the anode voltage of the CRT 1.

The CRT beam current is sensed by a circuit including resistors 10 and 13, diode 11 and capacitor 12. The resistor 10 is grounded and a current flowing through it is proportional to the CRT beam current. Consequently, the voltage developed across the resistor 10 is also proportional to the beam current, and this voltage is sensed by a half-wave rectifier formed by the diode 11, capacitor 12 and resistor 13.

The sensed analog signals representative of the beam current, the anode voltage and the high voltage supply voltage B+ are applied to an analog multiplexer 20. These analog voltages are sequentially applied by the multiplexer 20 to an analog-to-digital (A/D) converter 21. The output of the A/D converter 21 is a sequence of digital values of samples of successive ones of the analog signals representative of the CRT operating parameters beam current, anode voltage and high voltage supply voltage. The sequence of digital values is applied to a microprocessor 22.

The microprocessor 22 is shown connected to read-only memory (ROM) 23 and electrically erasable programmable read-only memory (EEPROM) 24. It will be understood that either ROM or EEPROM, or both, could be used, and they can be separate circuit elements or contained in the integrated circuit comprising the microprocessor 22. Moreover, other components could be included in the same integrated circuit. For example, Signetics type 8050 IC's which include a microprocessor, A/D converter and a multiplexer on one integrated circuit could be used.

A set of predetermined limit values of the CRT operating parameters are stored in the ROM 23, EEPROM 24 or a memory internal to the microprocessor 22. The memory also stores instructions for the microprocessor 22.

The operating parameters sensed by the circuit are correlated with X-ray production by the CRT during its operation. The stored predetermined limit values of the operating parameters include certain predetermined limit values corresponding to the limits of permissible X-ray production by the CRT. The comparison is continually carried out during CRT operation, and when the measured values of the operating parameters approach the predetermined limit values, the microprocessor 22 develops an appropriate output signal for initiating some adjustment of various operation controls for the CRT.

The possible various CRT operation controls include a hierarchy of actions, with the most severe being a complete shutdown of the apparatus. First, the microprocessor 22 controls the picture being shown. Next, it reduces the picture brightness. The next level of control is to shutdown the CRT anode voltage, and after that the B+ high voltage supply voltage. The most extreme action is to turn off all power.

An additional feature of the invention is the provision of a timer 30 which periodically applies a timing signal to the microprocessor 22. The microprocessor 22 then tests whether a predetermined number of parameter value comparisons have been carried out during an interval determined by the timer 30. If sensor signals are not being applied to the microprocessor 22, or if some other failure has prevented the microprocessor 22 from carrying out parameter value comparisons, then the microprocessor 22 detects this condition and shuts down CRT operation, for example through a B+ controller 35. Thus, the CRT cannot continue operating without being subject to the control of the protection circuit.

Another feature of the invention is that it can be used to regulate the operating parameters with respect to criteria other than X-ray production. For example, samples of the B+ voltage value are applied to the microprocessor 22. The controller 35 for the B+ voltage, which is responsive to a control signal, receives the control signal from the microprocessor 22 over the signal path 36. Thus, variations in B+ voltage can be regulated by the protection circuit. It should be noted that this function may require a more powerful microprocessor 22 and more memory than if only the X-ray protection function is carried out.

Figure 2:
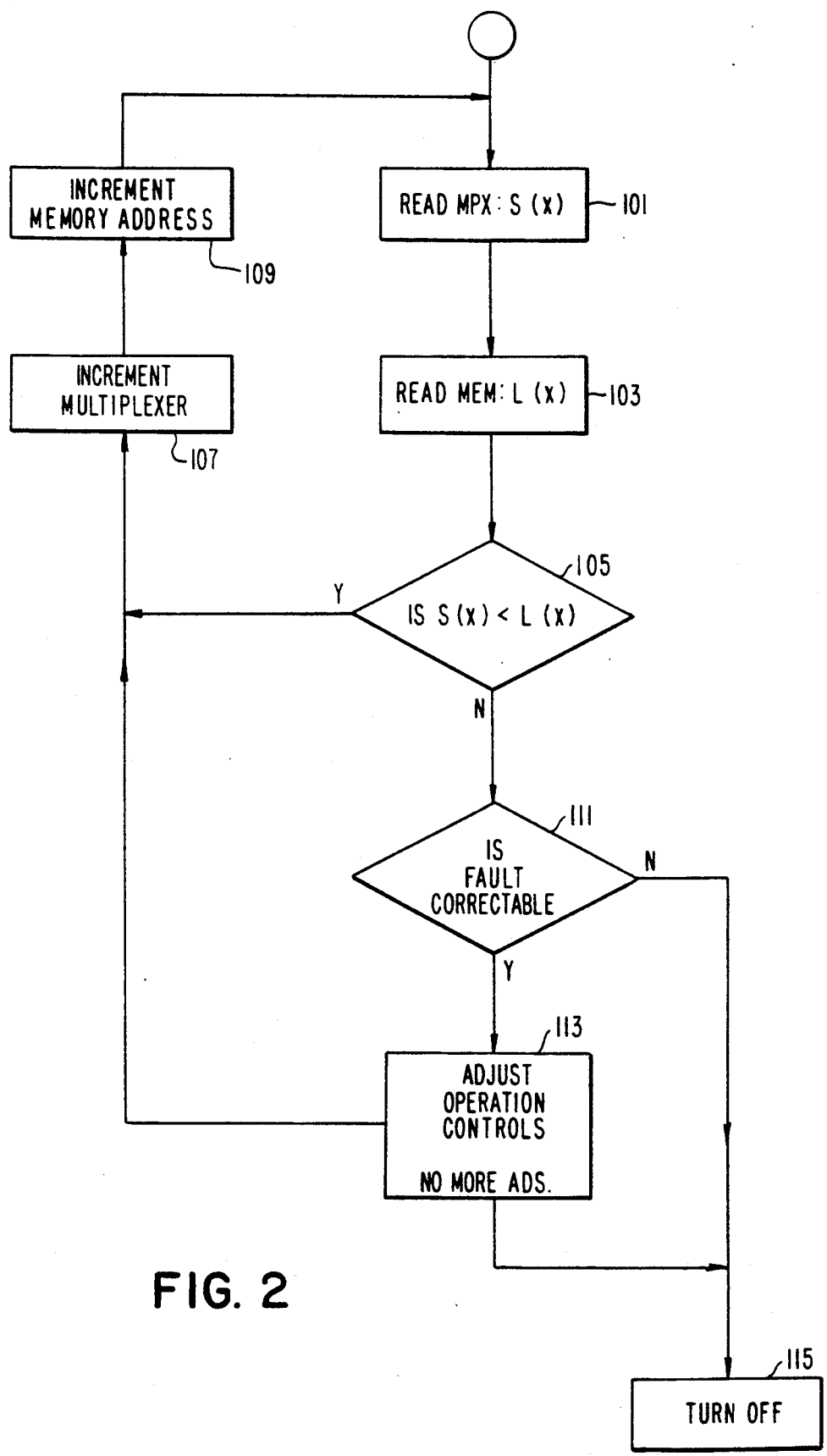
FIG. 2 is a flowchart of the protection method according to the invention.

FIG. 2 illustrates a flowchart of the operations carried out in order to control CRT operations. Initially, a sensor input is read and compared with a corresponding limit value (steps 101, 103 and 105). If the comparison indicates that the measured parameter value is within the predetermined limit, then the process continues of reading inputs and comparing them (steps 107, 109 and 101-105). If the comparison indicates that a measured value exceeds its corresponding limit value, then a determination is made as to whether further operation will be allowed (step 111). If further operation is allowed, the CRT operation controls are adjusted (step 113), and then the process of reading and comparing operating parameter values continues (steps 107, 109 and 101-105). On the other hand, if no further operation is to be permitted after an out-of-limit condition is detected, for example, because the out-of-limit condition has continued after a predetermined number of comparisons/adjustments, no further adjustment is made. Instead, the system is shut down (step 115).

Another feature of the invention includes a provision for displaying on the CRT a visual image to alert the viewer that adjustments are being made to the operation controls and that there is need for servicing. The displayed message can be simple for the purpose of merely alerting that servicing is required, or can include the identity of the parameter which requires correction and the out-of-range values in order to assist a technician in diagnosing the problem even before the apparatus containing the CRT is opened.

It will be appreciated that the particular adjustments made in response to an out-of-limit condition can be varied from the particular example given here, and different parameters can be sensed and compared in order to determine the need for adjustment. For example, instantaneous values of the beam current can be compared against a predetermined limit value, and a running average of the beam current can be determined by the microprocessor and the running average value can be compared with a different predetermined limit. Thus, the particular embodiment disclosed herein should be understood as being exemplary and not limiting, and that the scope of the invention is determined by the following claims.

What is claimed is:

1. A method of preventing excessive X-ray production from a cathode ray tube (CRT) operating in an apparatus, said method comprising the steps:
continually measuring operating parameters of the CRT that are correlated with X-ray production by the CRT during its operation, said operating parameters including at least a voltage on an anode of said CRT, and a beam current of said CRT;
continually comparing the measured operating parameter values during CRT operation with predetermined values of the operating parameters; and
adjusting various operation controls for the CRT to maintain the operating parameters below certain predetermined limit values corresponding to the limits of permissible X-ray production by the CRT, said operation controls include picture (or contrast) control, picture brightness, supply voltage, the color video broadcast signal (CVBS) input, and the high voltage.

2. A method according to claim 1, further comprising the step of turning off the apparatus having the CRT if adjusting the operation controls of the CRT cannot maintain the operating parameters of the CRT below the certain predetermined limit values.

3. A method according to claim 1, wherein the step of measuring operating parameters of the CRT further comprises measuring the high voltage supply voltage.

4. A method according to claim 1, wherein the step of continually comparing the measured operating parameters is carried out under microprocessor control; the step of continually comparing comprises using the microprocessor to compare each of the measured operating parameter values in succession with a corresponding limit value, and continually repeating the sequence of successive comparisons.

5. A method according to claim 1, wherein the step of adjusting various operation controls for the CRT comprises adjusting the various CRT operation controls within a hierarchical sequence.

6. A method according to claim 5, wherein the hierarchy of adjusting the various CRT operation controls comprises, in sequence:
lowering picture (or contrast) control,
lowering brightness control,
lowering supply voltage,
changing color video broadcast signal (CVBS) input,
switching off high voltage, and
switching apparatus off.

7. A method according to claim 1, further comprising the step of displaying on the CRT a message indicating that various operation controls are being changed and that a condition requiring correction exists.

8. A method according to claim 1, further comprising the step of displaying on the CRT at least the measured values of the operating parameters which exceed the predetermined limit values to permit viewing thereof.

9. A method according to claim 1, comprising interrupting the anode voltage if the result of a comparison operation is not obtained within a certain predetermined interval of time.

10. A method of preventing excessive X-ray production in an apparatus having a cathode ray tube, comprising:
operating an apparatus containing a cathode ray tube;
sensing analog operating parameters of the cathode ray tube that are correlated with X-ray production by the cathode ray tube during its operation, said operating parameters including at least an anode voltage of said cathode ray tube, and a beam current of said cathode ray tube;
generating digital signals each having a sequence of values corresponding to a sequence of samples of a respective one of the sensed parameters;
continually comparing the sequence of digital signal values with predetermined values of operating parameters during cathode ray tube operation; and
continually adjusting various operation controls for the cathode ray tube to maintain the operating parameters below certain predetermined values corresponding to the limits of permissible X-ray production, said operation controls including picture (or contrast) control, picture brightness control, the supply voltage, the color video broadcast signal (CVBS) input, and the high voltage.

11. A method according to claim 10, further comprising:
shutting off the apparatus if adjusting the various operation controls for the cathode ray tube cannot maintain the operating parameters of the cathode ray tube below the certain predetermined values.

12. In an apparatus having a cathode ray tube and a high voltage power supply for supplying high voltage to operate the cathode ray tube, the improvement comprising:
means for continually measuring operating parameters of said cathode ray tube, said operating parameters including an anode voltage of said cathode ray tube, and a beam current of said cathode ray tube;
means for storing predetermined values of the operating parameters of said cathode ray tube corresponding to the limits of permissible X-ray production by said cathode ray tube;
means for comparing the values of the continually measured operating parameters of said cathode ray tube with said predetermined limit values of operating parameters and for developing a corresponding output signal; and
means for adjusting various operation controls for said cathode ray tube in response to said output signal to maintain said operating parameters below said predetermined limit values corresponding to the limits of permissible X-ray production, said operation controls including picture (or contrast) control, picture brightness control, supply voltage, the color video broadcast signal (CVBS) input, and the high voltage.

13. An apparatus according to claim 12, wherein said measuring means comprises:
an analog-to-digital converter for converting analog signals to digital signals;
an analog multiplexer for receiving multiple analog signals and applying them to said analog-to-digital converter; and
a plurality of sensors, each sensor sensing one of said operating parameters of said cathode ray tube and developing an analog signal representative of the sensed parameter and applying the analog signal to said multiplexer.

14. An apparatus according to claim 13, wherein said sensors comprise:
means for sensing the cathode ray tube anode voltage; and
means for sensing the beam current of said cathode ray tube.

15. An apparatus according to claim 14, wherein said operation controls include the high voltage supply, and said sensors further comprise:
means for sensing the high voltage supply of said cathode ray tube.

16. An apparatus according to claim 12, wherein said storing means comprises a read only memory for storing a table of said predetermined limit values.

17. An apparatus according to claim 12, wherein said comparing means comprises:
a microprocessor programmed to compare the values of the continually measured operating parameters with said predetermined limit values and for developing output signals for adjusting the various operation controls for said cathode ray tube within a hierarchical sequence to maintain said operating parameters below said predetermined limit values.

18. An apparatus according to claim 17, wherein said hierarchical sequence of adjusting operation controls for said cathode ray tube comprises, in sequence:
lowering picture (or contrast) control,
lowering brightness control,
lowering supply voltage,
changing color video broadcast signal (CVBS) input,
switching off high voltage, and
switching apparatus off.

19. An apparatus according to claim 12, wherein said apparatus further comprises:
means for displaying on the CRT a message indicating that operation controls for the CRT are being adjusted and that a condition requiring correction exists.

20. An apparatus according to claim 16, wherein said means for displaying displays at least the measured values of the operating parameters which exceed that predetermined limit values to permit viewing thereof.

21. An apparatus according to claim 12, wherein said comparing means develops a control signal for regulating the high voltage supply voltage.

22. An apparatus according to claim 12, wherein said apparatus comprises a consumer television receiver, and said predetermined limit values are effective to maintain X-ray radiation within the isodose limits established by the United States Federal Government.

* * * * *